United States Patent

Shaw

[15] 3,644,755

[45] Feb. 22, 1972

[54] POWER CONTROL SYSTEM

[72] Inventor: Richard F. Shaw, North Attleboro, Mass.

[73] Assignee: Texas Instruments Incorporated, Dallas, Tex.

[22] Filed: Apr. 21, 1969

[21] Appl. No.: 817,757

[52] U.S. Cl. ....................... 307/252 B, 307/252 Q, 307/296, 307/305, 317/148.5

[51] Int. Cl. ....................... H03k 17/00

[58] Field of Search ....................307/252 B, 252 Q, 296, 305; 317/148.5

[56] References Cited

UNITED STATES PATENTS

| | | | |
|---|---|---|---|
| 3,132,287 | 5/1964 | Yarbrough | 307/252 |
| 3,444,448 | 5/1969 | Welch | 307/252 |
| 3,474,293 | 10/1969 | Siwko | 307/252 |
| 3,513,332 | 5/1970 | Snyder | 307/252 |

OTHER PUBLICATIONS

Galloway, G. E. Application Note 200.35, 3/66, p. 6, FIG. 8(c).

*Primary Examiner*—Donald D. Forrer
*Assistant Examiner*—David M. Carter
*Attorney*—Harold Levine, Edward J. Connors, Jr., John A. Haug, James P. McAndrews and Gerald B. Epstein

[57] ABSTRACT

A relatively low power level electrical signal is utilized for controlling the switching action of a plurality of relay networks in a power control system so as to control the AC power being supplied to a load. A plurality of switch branches are provided each including an AC power switch having a pair of power terminals and a control electrode arranged to carry a relatively high power level signal through its power terminals. Energization of the power switch is effected by the application of a relatively low power level signal to its control electrode through a switch such as a pair of relay contacts which need have only a relatively low power-handling capacity in comparison with the power level to be supplied across the power terminals of the AC power switch. A selectively energizable relay coil is serially connected to the power terminals and is operatively coupled to a pair of relay contacts in a succeeding switch brand, which in turn, are coupled to the control electrode of another similar AC power switch, and, upon closure energize this another power control switch so that the AC power signal flows through its power terminals in order to energize a load coupled thereto. The relay contacts coupled to the control electrode need only be sufficient to carry a relatively low power level signal in order to energize the another AC power switch, while the load power signal flowing through the power terminals may be at least an order of magnitude greater than that supplied to the control electrode for rendering the another power switch conductive.

6 Claims, 1 Drawing Figure

PATENTED FEB 22 1972 3,644,755
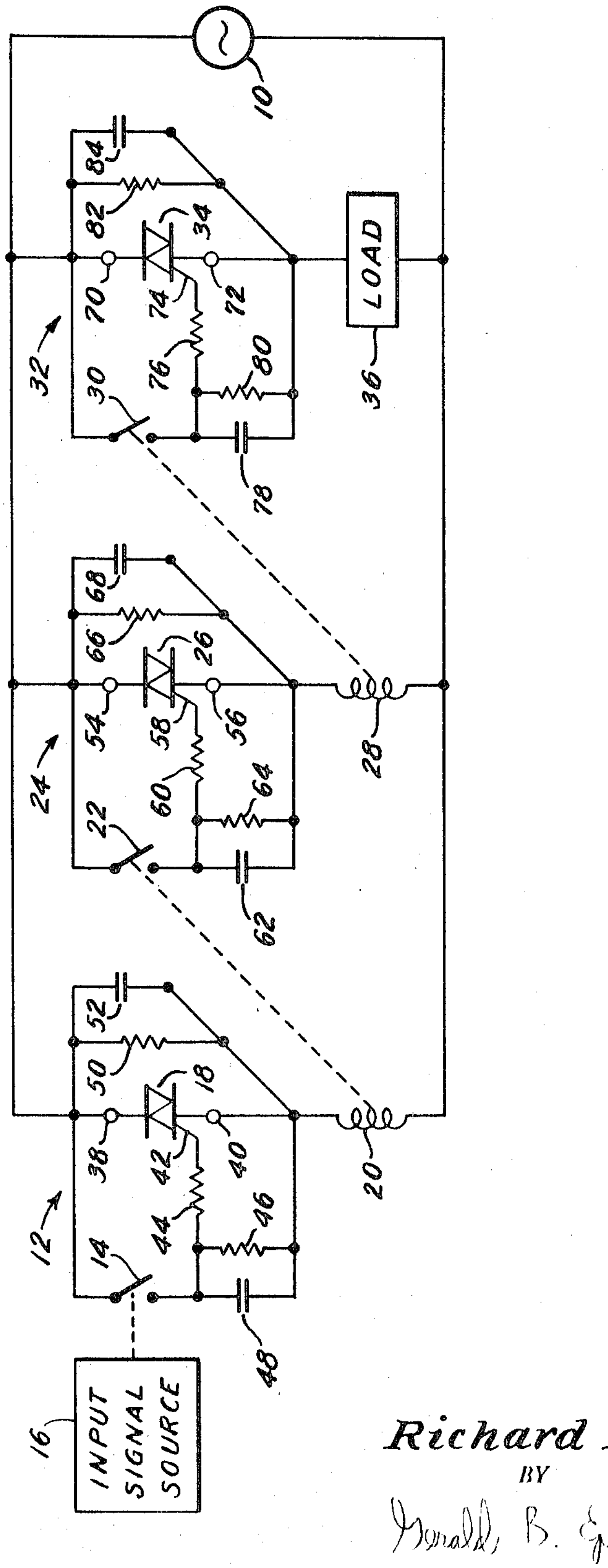
INVENTOR,
Richard F. Shaw,
BY
Gerald B. Epstein Att'y.

POWER CONTROL SYSTEM

The present invention relates generally to power control systems and more particularly is directed to a power control system in which control of a relatively high power level signal to be supplied to a load is effected by a switch having a relatively low power-handling capacity.

Various industrial power control systems are currently available, responsive to input signals in order to sequentially control various switch members or branches and selectively energize a load in accordance with input information furnished by a suitable signal source. If such systems utilize a DC input signal source for controlling the AC power being supplied to a load, it is generally necessary to suitably amplify the DC input signal and convert it to an AC signal in order to control the AC power being supplied to a load, thus requiring the provision of a relatively large and expensive circuit. In addition, when control of relatively high power level signals to be supplied to a load is desired, various switch branches including relay coils and relay contacts, are often utilized to effect the desired sequential switching operations. Accordingly, it is necessary to provide relatively high power-handling capacity relay contacts in order to effect the requisite switching operations. Furthermore, when relatively high power level AC signals are being switched, arcing often arises at the relay contacts which causes eventual erosion and deterioration of the contacts, necessitating frequent replacement. Even if relatively large contacts are provided having a relatively high power-handling capacity in order to provide a longer electrical lifetime, the resulting circuit becomes quite expensive and miniaturization in size becomes quite difficult or impossible to achieve.

Accordingly, it is an object of the present invention to provide an improved power control system which permits direct interface between a relatively low power level input control signal and a relatively high power level signal utilized for energizing a load.

It is another object of the present invention to provide an improved power control system which utilizes a relatively low power level signal for controlling the switching of a relatively high power level signal being supplied to a load.

It is a further object of the present invention to provide an improved power control system which is extremely durable in use, versatile in operation, small in size, and inexpensive.

Various other objects and advantages will become readily apparent from the following detailed description and accompanying drawing wherein:

The FIGURE is a schematic circuit diagram of an improved power control system in accordance with the principles of the present invention.

Referring generally to the FIGURE, a power control system in accordance with the principles of the present invention is illustrated. A suitable AC power source 10, such as a conventional 115-volt, 60Hz. AC power supply is provided for supplying power to the system. The system includes an input switch branch 12 having an input switch 14, which is connected to a suitable input signal source 16. The input switch branch 12 includes an AC power switch 18 which is adapted to supply power to a current-responsive means 20 coupled between its power terminals and the power supply 10. The current-responsive means 20 is operatively connected to a switch means 22 comprising the input of a coupling switch branch 24, including another AC power switch 26 which is adapted to be energized in response to operation of the switch means 22. The AC power switch 26 is also connected to a current-responsive means 28 and is adapted to effect energization thereof, when the AC power switch 26 is rendered conductive. The current-responsive means 28 is operatively connected to a switch means 30 in an output amplifier branch 32, which includes another similar AC power switch 34 adapted to be rendered conductive in response to closure of the switch means 30. The AC power switch 34 is effective to connect the power supply 10 to a load 36 coupled to its power terminals. As illustrated, the input switch branch 12, the coupling switch branch 24, and the output amplifier switch branch 32 are arranged in cascade and connected in parallel relationship with each other, and are sequentially energized in response to control signals from the input signal source.

More particularly, in accordance with an important advantage of the present invention a relatively low power level input signal may be utilized for controlling a relatively high power level signal, which is being supplied to the load 36. Thus, high power capacity relays are not required so that the physical size of the system may be significantly reduced, amplification of the switching signal is achieved without additional amplifier stages, and direct interface between the input signal source and the switch branch circuits may be achieved so as to control the supply of power to the load in an efficient and inexpensive manner.

The input signal source 16 may merely comprise a pair of relay contacts or a limit switch coupled to a suitable energizing means, a positive temperature coefficient thermal element, a magnetic sensor, a photoelectric sensor, or a low-level DC signal source such as the output from an integrated circuit. In a preferred embodiment, the input signal source comprises a suitable device for providing a relatively low power level control signal, the input signal source utilized depending, of course, upon the desired usage and requirements of the overall system. In any event, significant advantages are attained particularly when a relatively low power level DC signal source comprises the input signal source 12 since the present invention permits direct interface between such a signal source and the power control system.

The switch means 14 in the input switch branch 12 of the power control system may be suitably coupled to the input signal source 16 in a desired fashion. In addition, the input signal source 16 may be directly connected to the AC power switch 18 to directly control its conduction. In the illustrated embodiment, the switch means 14 comprises a selectively energizable switch which is energized by the input signal source 16 to effect closure thereof. The AC power switch 18, preferably comprises a triac having a pair of power terminals 38 and 40 and having a gate electrode 42 coupled to the switch 14 through a current-limiting gate resistor 44. The triac 18 is normally nonconductive until a gating signal is applied to its gate electrode 42 incident to closure of the switch 14. Thus, power is not supplied to the current-responsive means 20 until the triac 18 is rendered conductive by a gating signal. In this regard, it should be noted that in one embodiment of the present invention a gating signal of the order of approximately 30 milliamperes at approximately 5 volts applied to the gate terminal of the triac has been found sufficient to render it conductive. Thus, the switch 14 need only have the power-handling capacity for carrying an electrical signal of this magnitude in order to effect energization or conduction of the triac 18, while the triac is capable of carrying power levels which are several orders of magnitude higher across its power terminals. In this connection, in the preceding example the triac rendered conductive by a gate signal of 30 milliamperes at 5 volts may typically handle an AC signal of 10 amperes at 115 volts across its power terminals. In addition, it should be noted that the triac is an extremely fast response device and is generally rendered conductive by the application of a gating signal in a time interval of several microseconds. Furthermore, the triac is connected across the switch 14 and shunts the switch upon being rendered conductive. Thus, in those instances, where the input signal source 16 is directly connected to the gate resistor 44 for triggering the triac 18, a relatively low power level signal may be provided by the input signal source, and sufficient to render the triac conductive, whereupon a substantially higher power level signal would flow through its power terminals, thereby achieving power amplification by controlling a high power level signal with a low power level signal. Similarly, in accordance with another important advantage of the present invention the contacts comprising the switch means 14 need only have a relatively low power-handling capacity, since even when coupling the power supply 10 to the gate electrode 42 of the triac 18, an extremely brief time interval is involved in view of the extremely rapid response time of the triac and further in view of the relatively low power level signal required for gating the triac conductive. Furthermore, upon energization, the triac 18 shunts or short circuits the contacts of switch 14 and connects the power supply to the current-responsive means 20 through its power terminals 38, 40.

The advantage of such a provision is particularly apparent when considering the substantial size reduction of the switch contacts which is made possible by obviating the need for switch contacts having a large power-handling capacity. In this connection, it may be noted that a common problem arises, when utilizing contacts subjected to repeated on-off cycling due to the effects of electrical arcing between the contacts during opening and closing thereof. Such arcing is particularly evident when utilizing relay contacts having a high power-handling capacity and which are relatively large in size, since a certain amount of mechanical bounce occurs due to the inertia of the contacts during the close cycle. Such mechanical bounce may result in harmful electrical arcing and eventual physical deterioration. However, such arcing is substantially completely avoided utilizing the arrangement of the present invention in which the contacts, upon closure, are substantially instantaneously shunted by the power terminals of the triac and need only carry relatively low power level signals to be coupled to the gate electrode of the triac. In addition, upon opening of the contacts, the arcing problem does not occur since the triac is rendered nonconductive as the applied AC signal across its power terminals passes through approximately a zero current level in the absence of a gate trigger signal.

The switch branch 12 also includes a parallel-connected resistor 46 and capacitor 48 coupled to the gate resistor 44 and functioning as a gate filter in order to prevent switching transients or line disturbances from inadvertently triggering the triac. Also, a parallel-connected resistor 50 and capacitor 52 are coupled across the power terminals of the triac, as illustrated, in order to prevent transients or disturbances present in the line voltage from inadvertently triggering the triac. These protective filter networks are desirable in view of the relatively high sensitivity of the gate electrode of the triac.

The current-responsive means 20 preferably comprises a selectively energizable relay coil, which is energized in response to current being supplied thereto by conduction of the triac 18. The relay coil 20 is also operatively coupled to the switch means 22, which preferably comprises a pair of relay contacts, which in the illustrated embodiment are open and are adapted to be closed in response to energization of the relay coil 20. Thus, closure of the relay contacts 22 is effective to energize the coupling switch branch 24. In this connection the AC power switch 26 also preferably comprises a triac having a pair of power terminals 54 and 56 and having a gate electrode 58 coupled to the relay contacts 22 through a gate resistor 60. Thus, it may be seen that operation of the coupling switch branch 24 is substantially similar to the input switch branch 12. More particularly, when the relay coil 20 is energized by conduction of the triac 18, it effects closure of the relay contacts 22 which causes the application of a signal to the gate electrode 58 of triac 26 to effect energization or conduction of the triac 26. As previously explained, the triac has an extremely fast response of the order of several microseconds and requires a relatively low power level gate signal in order to be rendered conductive. Thus, when the relay contacts 22 are closed to apply a gate signal to the triac 26, the triac 26 is virtually instantaneously energized and shunts the relay contacts 22 before any appreciable power flow can occur across the relay contacts 22. Thus, the relay contacts 22 are substantially protected from the arcing which might otherwise occur when relatively high power level signals are being switched by the opening and closing of the contacts. When the triac 26 is rendered conductive it connects the power supply 10 through its power terminals 54, 56, to the current-responsive means 28, which also preferably comprises a selectively energizable relay coil, and, as illustrated, is operatively coupled to the switch means 30 in the amplifier output branch 32. In addition, a parallel-connected capacitor 62 and resistor 64 are coupled to the gate resistor 60 to function as a gate filter and prevent transient signals from inadvertently triggering the triac 26. Similarly, a parallel-connected resistor 66 and capacitor 68 are connected across the power terminals of the triac 26 to function as a line filter and prevent line transients from effecting inadvertent energization of the triac 26.

The switch means 30 also preferably comprises a pair of relay contacts which, in the illustrated embodiment, are open and are operatively coupled to the relay coil 28 and adapted to be closed in response to energization of the relay coil. The relay contacts 30 are generally similar to the relay contacts 22 and preferably are relatively small in size and adapted to carry a relatively low power level signal. In this connection, the relay contacts 30 are similarly arranged to effect energization of the AC power switch 34. More particularly, the AC power switch 34 also preferably comprises a triac having power terminals 70 and 72 and having a gate electrode 74, which is coupled to the relay contacts 30 through a gate resistor 76. Thus, operation of the amplifier switch branch 32 may be seen to be generally similar to the operation of the input switch branch 12 and the coupling switch branch 24, except that the amplifier switch branch 32 is directly coupled to the load 36 and utilizes the relatively low power level signal supplied through the relay contacts 30 to the gate electrode 74 of the triac 34 to switch a relatively high power level signal to the load 36 and is accordingly referred to as the amplifier switch branch. In this connection, in operation energization of the relay coil 28 operatively connected to the relay contacts 30 effects closure of the contacts so that a signal is supplied to the gate electrode 74 of the triac 34 through the contacts 30 and the gate resistor 76. As previously explained, the triac is a very fast response time device and thus is virtually instantaneously rendered conductive by the gating signal before a high power level signal can flow through the contacts 30, thereby permitting the use of contacts having a relatively low power-handling capacity. Similarly, as soon as the triac 34 is rendered conductive its power terminals 70, 72 shunt or short circuit the relay contacts 30 thereby removing the electrical signal from the contacts and coupling the power supply 10 directly to the load 36 so as to effect energization thereof. In addition, a gate filter including a parallel-connected capacitor 78 and resistor 80 is provided coupled to the gate electrode 74 of the triac to prevent electrical transients from effecting energization of the triac. Also, a line filter network including a parallel-connected resistor 82 and capacitor 84 are coupled across the power terminals 70, 72 of the triac to prevent transients in the line voltage from causing inadvertent energization of the triac.

In the illustrated embodiment, the load is not illustrated in detail, but may comprise virtually any desired resistive, inductive, or capacitive load. In accordance with a preferred usage of the present invention, the power control system is particularly adapted for controlling the power being supplied to a solenoid in accordance with instructions supplied from an input source.

It should be noted that for simplicity of illustration only three switch branches 12, 24, and 32 have been illustrated. However, a desired number of switch branches may be provided in accordance with the ultimate circuit function desired or alternatively, the input signal source may be directly connected to the power amplifier branch which energizes the load if such a configuration is sufficient in the desired circuit application. Similarly, in certain instances it may be desirable to include a suitable time delay circuit coupled between the input control switch branch and the power amplifier output switch branch. Such a time delay circuit is described in detail in a copending application Ser. No. 817,756 filed concurrently herewith, now U.S. Pat. No. 3,575,639 assigned to the same assignee as the present application. Such a time delay circuit may be of an "ON" delay or "OFF" delay circuit. In the "ON"

delay configuration the circuit is arranged to provide a predetermined time delay after energization by the input signal source before coupling the switching signal to the next succeeding switch branch. Similarly, in the "OFF" delay configuration the time delay circuit is arranged to provide a preselected time delay after receiving a control signal to effect disruption of the power signal before deenergizing the next succeeding switch branch in order to effect disruption of the power being supplied to the load.

It may be readily appreciated, that, although the foregoing description was principally directed to the manner in which energization of the load 36 is achieved, the converse situation, whereby the input signal source provides information to effect deenergization or opening of the various successive switch branches follows the same general pattern of operation. In this connection, the switch signal utilized in the relay contact-triac gate electrode circuit similarly comprises a relatively low power level signal which may render the associated triac nonconductive so as to remove the high power level flowing through its power terminals, when the associated relay contacts coupled to its gate electrode are opened. More particularly, in the illustrated embodiment, the triacs 18, 26, and 34 are operated in the self-gated mode and remain energized as long as an appropriate gate signal is maintained. However, upon removal of the gate signal the triac is deenergized as soon as the applied alternating current power signal across its power terminals passes through approximately the zero level. Thus, a relatively low power level signal is utilized for controlling a relatively high power level signal, and the relay contacts need not have a high power capacity. Similarly, if a particular triac in one of the switch branches is deenergized or rendered nonconductive, the associated current-responsive means or relay coil coupled thereto is similarly deenergized effecting opening of its associated relay contacts, which effects deenergization of the next succeeding switch branch in the cascaded arrangement, eventually resulting in deenergization of the power switch branch 32 and disruption of the power being supplied to the load 36. Thus, operation of the power control system and control of the power being supplied to the load 36 is readily effected in accordance with the input information furnished from the input signal source 16.

Thus, a novel power control system for conveniently controlling the power being supplied to a load has been described in detail.

Various changes and modifications of the illustrated embodiment will be readily apparent to one skilled in the art and such changes or modifications are deemed to be within the spirit and scope of the present invention as set forth in the appended claims.

What is claimed is:

1. A power control system comprising means for supplying AC power, a first selectively energizable switch means adapted to be energized in response to the passage therethrough of a relatively low power level electrical signal and to be deenergized in response to the disruption of the passage therethrough of the relatively low power level electrical signal, a selectively energizable AC power switch means having a control element and a pair of power terminals, said control element being adapted to control the passage of a relatively high-level AC signal through said power terminals, said power terminals being connected across said first switch means for shunting substantially all of the AC power supplied by the AC power supply away from said first switch means and through said AC power switch means substantially instantaneously upon conduction of said AC power switch means, means for connecting said first switch means to said control electrode so as to render said AC power switch means conductive in response to energization of said first switch means and to render said AC power switch means nonconductive in response to deenergization of said first switch means upon removal of the relatively lower power electrical signal, and means for connecting a load between said AC power switch means and the means for supplying AC power, the load being supplied with said relatively high power level AC signal through said power terminals when said AC power switch means is conductive.

2. A power control system in accordance with claim 1 wherein said first switch means includes a pair of normally open contacts adapted to be respectively closed and opened in response to the application and nonapplication of said relatively low power level signal, said contacts being connected between said means for supplying AC power and said control element, said AC power switch comprises a triac having its power terminals connected across said contacts so as to shunt said contacts upon conduction of said triac, and said control element comprises the gate electrode of said triac, said gate electrode being adapted to render said triac conductive in response to closure of said contacts so as to shunt said contacts and supply said relatively high power level AC signal to said load through said power terminals of said triac.

3. A power control system comprising means for supplying AC power, a first switch means adapted to be energized in response to the passage therethrough of a relatively low power level input signal and to be deenergized in response to the disruption of the passage therethrough of the relatively low power level signal, a first selectively energizable AC power switch means having a pair of power terminals and having a control element for controlling the passage of a relatively high power level AC signal through said power terminals, said power terminals being connected across said first switch means for shunting said first switch means when said first AC power switch means is energized, means for coupling said first switch means to said control element so as to initiate conduction of said first AC power switch in response to energization of said first switch means and to initiate nonconduction thereof in response to deenergization of said first switch means, a current-responsive means coupled between said first AC power switch means and the means for supplying AC power, whereby current is supplied to said current-responsive means when said AC power switch means is energized, a second switch means operatively coupled to said current-responsive means, said second switch means being energized in response to the flow of current through said current-responsive means, a second selectively energizable AC power switch means electrically connected in parallel relationship with said first AC power switch means and having a pair of power terminals and having a control element for controlling the passage of a relatively high power level AC signal through said power terminals, said power terminals being connected across said second switch means for shunting said second switch means when said second AC power switch means is energized, means for coupling said second switch means to said control element of said second AC power switch means so as to initiate conduction of said second AC power switch means in response to energization of said second switch means, and means for connecting a load coupled between said power terminals of said second AC power switch means and the means for supplying AC power, whereby said load is supplied with said relatively high power level AC signal when said second AC power switch means is energized.

4. A power control system in accordance with claim 3 wherein said first switch means comprises a switch having a pair of normally open contacts adapted to be closed in response to said relatively low power level signal, said contacts being connected between said means for supplying AC power and said control element of said first AC power switch means, said first AC power switch means comprises a triac and said control element of said triac comprises a gate electrode, said gate electrode being adapted to effect energization of said triac in response to closure of said contacts so as to shunt said contacts and supply said relatively high power level AC signal to said current-responsive means through said power terminals of said triac, said current-responsive means comprises a selectively energizable relay coil, said second switch means comprises a pair of normally open relay contacts adapted to be closed in response to energization of said relay coil, said second AC power switch means comprises another triac and said control element of said another triac comprises a gate electrode, said gate electrode of said another triac being adapted to effect energization of said another triac in response to closure of said relay contacts so as to shunt said contacts and supply said relatively high power level AC signal to the load.

5. A power control system in accordance with claim 4 wherein said triac and said another triac each has an extremely fast response time so as to be rendered conductive relatively rapidly in response to energization of its associated gate electrode, thereby minimizing the flow of current through the first switch means and the second switch means respectively when said first and said second switch means are energized.

6. A power control system in accordance with claim 4 wherein said triac and said another triac substantially completely shunt said first switch means and said second switch means respectively upon energization of said triac and said another triac through their associated gate electrodes so as to obviate the necessity for providing high current capacity contacts for said first switch means and said second switch means.

* * * * *